(12) United States Patent
Yamashita et al.

(10) Patent No.: US 7,324,807 B2
(45) Date of Patent: *Jan. 29, 2008

(54) INFORMATION PROCESSING UNIT

(75) Inventors: Naoto Yamashita, Kawasaki (JP);
Kazutoyo Inamitsu, Tokyo (JP)

(73) Assignee: Fujitsu Limited, Kawasaki (JP)

( * ) Notice: Subject to any disclaimer, the term of this patent is extended or adjusted under 35 U.S.C. 154(b) by 275 days.

This patent is subject to a terminal disclaimer.

(21) Appl. No.: 11/014,771

(22) Filed: Dec. 20, 2004

(65) Prior Publication Data

US 2005/0151621 A1 Jul. 14, 2005

Related U.S. Application Data

(63) Continuation-in-part of application No. 10/849,871, filed on May 21, 2004.

(30) Foreign Application Priority Data

Dec. 19, 2003 (JP) ............................. 2003-423598
Nov. 24, 2004 (JP) ............................. 2004-338323

(51) Int. Cl.
*H04M 1/66* (2006.01)
*H04M 1/68* (2006.01)
*H04M 3/16* (2006.01)

(52) U.S. Cl. .................... 455/411; 455/410; 455/26.1; 455/556.1; 455/564; 455/565; 455/575.1; 455/575.3; 455/90.3; 455/344; 455/347; 455/349; 982/313; 982/315; 982/115; 982/116; 982/124; 982/126; 396/15; 713/186; 379/93.02; 379/93.03; 379/433.1; 379/433.13; 379/440; 379/445

(58) Field of Classification Search ........ 455/410–411, 455/463, 556.1–556.2, 557, 575.1, 3, 90.3, 455/563–565, 423–425, 528, 66.1, 550.1, 455/344, 349, 26.1; 379/93.02–93.03, 433.01, 379/433.1, 13, 440, 445; 382/115–127, 312–315; 396/15; 713/185–186; 340/5.52–5.53, 5.61, 340/5.8, 5.81–5.82; 235/379–380, 382, 382.5
See application file for complete search history.

(56) References Cited

U.S. PATENT DOCUMENTS 4,792,226 A 12/1988 Fishbine et al. .............. 356/71

(Continued)

FOREIGN PATENT DOCUMENTS

JP 64-3974 1/1989

(Continued)

OTHER PUBLICATIONS

European Patent Office Communication including European Search Report for corresponding European Patent Application 04257913 dated Mar. 30, 2005.

(Continued)

*Primary Examiner*—Tuan A. Tran
(74) *Attorney, Agent, or Firm*—Kratz, Quintos & Hanson, LLP

(57) ABSTRACT

An information processing unit, such as a mobile phone, equipped with a fingerprint sensor and which reconciles size reduction with operability at a high level. Adjacent to an operation panel is located a V-shaped groove which contains a first slope stretching away from the operation panel and slanting downward and a second slope stretching further away from the operation panel and slanting upward, where the V-shaped groove contains a fingerprint sweep sensor which detects a fingerprint on a finger moved along the first slope and the second slope.

3 Claims, 5 Drawing Sheets

U.S. PATENT DOCUMENTS

| | | | |
|---|---|---|---|
| 6,028,950 A * | 2/2000 | Merjanian | 382/126 |
| 6,088,585 A * | 7/2000 | Schmitt et al. | 455/411 |
| 6,330,457 B1 * | 12/2001 | Yoon | 455/550.1 |
| 6,496,630 B2 * | 12/2002 | Iwai et al. | 385/120 |
| 6,504,945 B1 * | 1/2003 | Helot et al. | 382/126 |
| 6,628,812 B1 * | 9/2003 | Setlak et al. | 382/124 |
| 6,788,928 B2 * | 9/2004 | Kohinata et al. | 455/411 |
| 6,798,335 B2 * | 9/2004 | Miyashita et al. | 340/5.53 |
| 7,079,833 B2 * | 7/2006 | Ohba | 455/410 |
| 7,088,220 B2 * | 8/2006 | Kotzin | 340/5.82 |
| 7,146,029 B2 * | 12/2006 | Manansala | 382/126 |
| 2003/0021495 A1 * | 1/2003 | Cheng | 382/312 |
| 2003/0156743 A1 | 8/2003 | Okada et al. | 382/124 |

FOREIGN PATENT DOCUMENTS

| | | |
|---|---|---|
| JP | 2001-256470 | 9/2001 |
| JP | 2001-256487 | 9/2001 |
| JP | 2002-216116 | 8/2002 |
| JP | 2002-279412 | 9/2002 |
| JP | 2002-298128 * | 10/2002 |
| JP | 2003-235830 | 8/2003 |
| JP | 2003-298711 | 10/2003 |

OTHER PUBLICATIONS

Notification of Reasons for Refusal dated Apr. 19, 2005 from the Japanese Patent Office (5 pages, inclding English translation).

"Developed FOMA 900i series, the mobile phone which surpassed Mova®," URL: http://www.nttdocomo.co.jp/new/contents/03/whatnew1218, print date Apr. 11, 2005 (with English translation), 7 pages.

"F900i with advanced fingerprint sensor," from Mobile News updated Dec. 18, 2003, URL: http://www.itmedia.co.jp/mobile/0312/18/n_f900.html, (with English translation), 5 pages).

"F900I, a terminal with a fingerprint sensor," URL: http://k-tai.impress.co.jp/cda/article/news_toppage/16933.html, print date Apr. 11, 2005.

* cited by examiner

INFORMATION PROCESSING UNIT

RELATED APPLICATION

This application claims priority under 35 U.S.C. § 119 of Japanese Application No. 2004-338323, filed Nov. 24, 2004 and Japanese Application No. 2003-423598 filed Dec. 19, 2003, and is a continuation-in-part of U.S. application Ser. No. 10/849,871 filed May 21, 2004, which application claims priority under 35 U.S.C. § 119 of Japanese Application No. 2003-423598 filed Dec. 19, 2003, all of which are incorporated herein by reference.

BACKGROUND OF THE INVENTION

1. Field of the Invention

The present invention relates to information processing units, such as mobile phones including a PHS (Personal Handyphone System), equipped with a fingerprint sensor and operation keys.

2. Description of the Related Art

Recently, mobile phones have spread at a remarkable pace and have developed as portable information processing units which are equipped with multiple functions including not only simple telephone functions, but also e-mail functions and enhanced memory functions for storing various personal information such as telephone numbers.

Big problems posed by such development of mobile phones include illegal use of mobile phones and unauthorized outflow of information stored in mobile phones.

One of the conventional techniques used to solve these problems involves enabling the use of the mobile phone only when a registered personal identification number is entered.

Because it is troublesome to enter a personal identification number, mobile phones which are equipped with a fingerprint sensor and are enabled only when a registered fingerprint is detected have recently been proposed and actually put on the market (see, for example, Japanese Patent Laid Open No. 2002-216116 and Japanese Patent Laid Open No. 2002-279412. The fingerprint sensor is on a considerably high level in terms of prevention of illegal use and convenience of handling.

Although it is desirable from a security standpoint to mount a fingerprint sensor on mobile phones, under circumstances where there is demand for size and weight reduction of mobile phones and the mobile phones have been downsized close to the limit considering the operability for users, the question is what fingerprint sensor to mount and in what part of the mobile phones.

Operation keys and a screen essential for the mobile phones are laid out in such a way as to face the user simultaneously under normal use so that the user can operate the operation key by looking at the screen. Although it is conceivable to install the fingerprint sensor in a space provided on the back face opposite the front face which contains the operation keys and screen, the fingerprint sensor functions as a kind of operation key operated by the user and installing the fingerprint sensor on the back face sacrifices the operability.

Japanese Patent Laid Open No. 2002-216116 and Japanese Patent Laid Open No. 2002-279412 propose the use of a fingerprint sweep sensor which reads a fingerprint as the user moves a finger at right angles to a line sensor consisting of minute sensors arranged one-dimensionally.

The fingerprint sweep sensor does not require much installation space and can be installed on the front face of the mobile phone without increasing the size of the mobile phone, as shown in Japanese Patent Laid Open No. 2002-216116 and Japanese Patent Laid Open No. 2002-279412 Japanese Patent Laid Open No. 2002-216116 shows a drawing in which the fingerprint sweep sensor is installed adjacent to the operation keys while Japanese Patent Laid Open No. 2002-279412 shows a drawing in which the fingerprint sweep sensor is installed adjacent to the screen.

However, if the fingerprint sweep sensor is installed adjacent to the operation keys without taking any measures, there is a danger of pressing operation keys adjacent to the fingerprint sensor by mistake when moving the finger along the fingerprint sensor. Also, if the fingerprint sensor is installed adjacent to the screen, that part of the screen which is adjacent to the fingerprint sensor may become dirty by being touched by fingertips. However, installing the fingerprint sensor on that part of the mobile phone surface which is distant from the operation keys and screen to prevent the above problems would go counter to the demand for size reduction of the mobile phone.

Also, the fingerprint sweep sensor, which does not require much installation space, can be installed on a flank portion of the mobile phone. In that case, however, the problem of operability remains, as is the case when the fingerprint sensor is installed on the back face. The above problems are not specific to mobile phones, but are common to information processing units equipped with a fingerprint sensor and operation keys.

In view of the above circumstances, the present invention has an object to provide an information processing unit which is equipped with a fingerprint sensor and reconciles size reduction with operability at a high level.

SUMMARY OF THE INVENTION

To achieve the above object, the present invention provides an information processing unit which comprises a casing equipped with a control pad, wherein:

the casing comprises, adjacent to the control pad, a groove which contains a first slope stretching away from the control pad and slanting downward and a second slope stretching further away from the control pad and slanting upward;

the groove comprises a fingerprint sensor which detects a fingerprint on a finger moved along the first slope and the second slope; and the first slope and the second slope have mutually different tilt angles.

In the information processing unit according to the present invention, preferably the fingerprint sensor is a fingerprint sweep sensor.

In the information processing unit according to the present invention, since the fingerprint sensor is contained in the groove, the first slope of the groove prevents operation keys from being pressed inadvertently when a finger is moved along the fingerprint sensor. Also, the information processing unit allows the user to move the finger along the first slope and second slope by applying it reliably to the fingerprint sensor using both sides of the slopes as a guide. This allows reliable detection of the fingerprint.

Preferably, the first slope and the second slope have mutually different tilt angles which are determined from the standpoint of preventing misoperation and reliably detecting the fingerprint. In that case, preferably the first slope has a larger tilt angle than the second slope.

If the fingerprint sensor installed in the information processing unit according to the present invention is a fingerprint sweep sensor, preferably the fingerprint sweep sensor has a surface protruding above an inner surface of the groove. Also, preferably the fingerprint sweep sensor is located in the groove in such a way as to hide a ridge line where an extension surface of the first slope and an extension surface of the second slope meet.

By making the fingerprint sweep sensor protrude above the inner surface of the groove and lie at the bottom of the groove under which lies a ridge line, it is possible to move the finger in tight contact with the fingerprint sweep sensor, and thus detect the fingerprint reliably.

As described above, by installing the fingerprint sensor adjacent to the control pad and on the same surface as the control pad, the present invention can reconcile size reduction with operability at a high level.

DETAILED DESCRIPTION OF THE PREFERRED EMBODIMENTS

An embodiment of the present invention will be described below.

Figure 1:
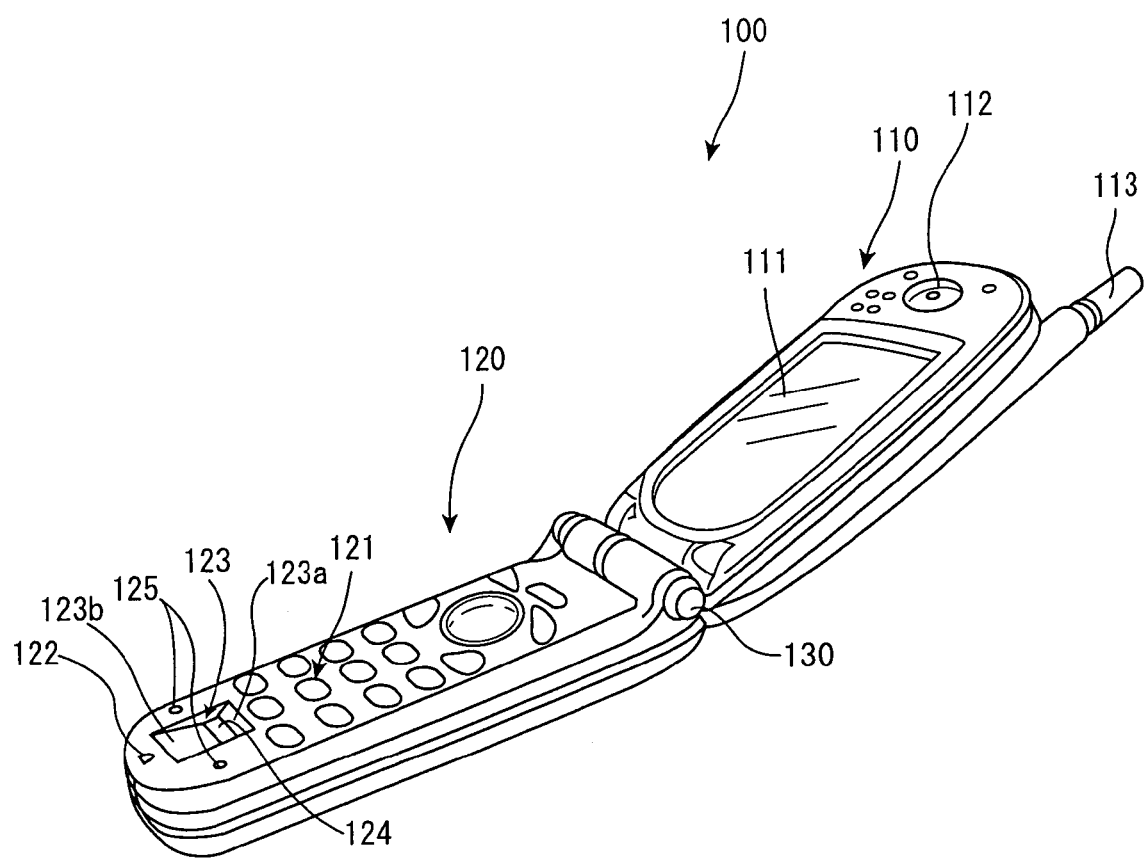
FIG. 1 is an external perspective view of a mobile phone according to an embodiment of the present invention.

FIG. 1 is an external perspective view of a mobile phone which is an embodiment of an information processing unit according to the present invention.

The mobile phone 100 is a folder type phone which has a top casing 110 and bottom casing 120 pivotably joined by a hinge 130, where the top casing 110 contains a display screen 111, earpiece 112, antenna 113, etc.; and the bottom casing 120 is equipped with an operation panel 121, mouthpiece 122, etc. The bottom casing 120 of the mobile phone 100 contains a V-shaped groove 123 adjacent to and just below the operation panel 121. A fingerprint sweep sensor 124 is installed at the bottom of the V-shaped groove 123. Besides, on both sides of the V-shaped groove 123 in the bottom casing 120 are a pair of cushion pads 125 which consist of a soft material (e.g., rubber) protruding a little above the surface of the bottom casing 120 and serve as a cushion to prevent the top casing 110 from coming into direct contact with the bottom casing 120 when the top casing 110 is folded over the bottom casing 120. According to this embodiment, the cushion pads 125 also serve as orientation marks during fingerprint detection. Details will be described later.

Figure 2:
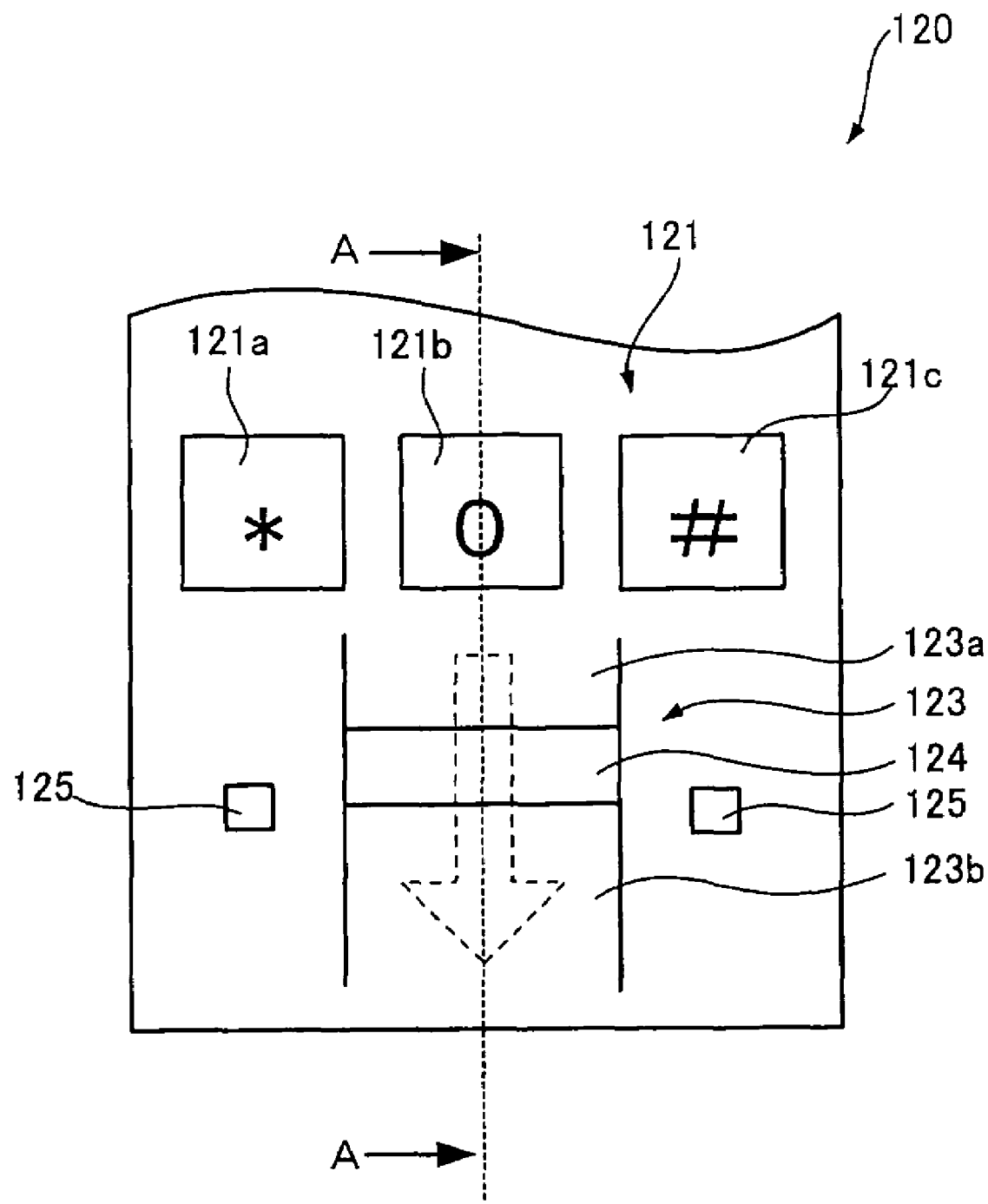
FIG. 2 is a plan view showing a part around a fingerprint sweep sensor of the mobile phone 100 shown in FIG. 1.
Figure 3:
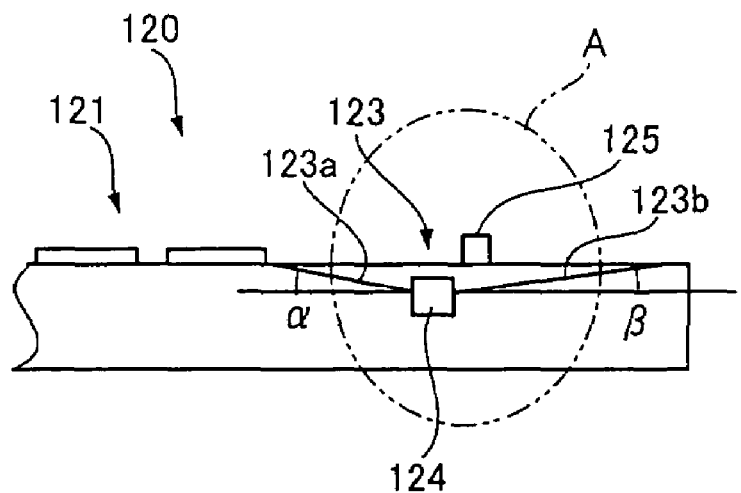
FIG. 3 is a sectional view taken along A-A line in FIG. 2.
Figure 4:
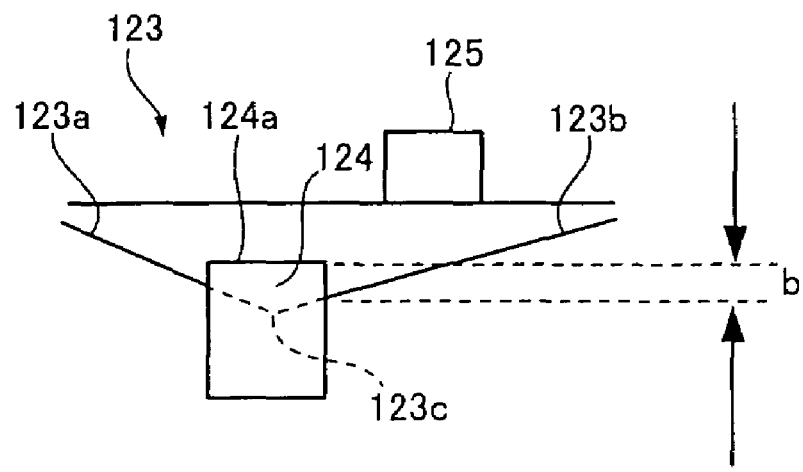
FIG. 4 is a partially enlarged view of the part enclosed by a chain double-dashed line A in FIG. 3.

FIG. 2 is a plan view showing a part around the fingerprint sweep sensor of the mobile phone 100 shown in FIG. 1, FIG. 3 is a sectional view taken along A-A line in FIG. 2, and FIG. 4 is a partially enlarged view of the part enclosed by a chain double-dashed line A in FIG. 3.

FIG. 2 shows three keys 121a, 121b, and 121c located at the bottom of the multiple keys on the operation panel 121. The V-shaped groove 123 is located just below the center key 121b of the three keys 121a, 121b, and 121c at the bottom of the bottom casing 120.

The V-shaped groove 123 contains a downward slope 123a stretching away from the key 121b and an upward slope 123b stretching further away from the key 121b. The V-shaped groove 123 also contains the fingerprint sweep sensor 124.

In order for the fingerprint sweep sensor 124 to detect a fingerprint, the user should apply a finger in such a way that the last joint closest to the fingertip is positioned on a straight line joining the two cushion pads 125 and move the finger along the downward slope 123a and upward slope 123b in the V-shaped groove 123 in the direction of the arrow indicated by the dotted arrow in FIG. 2. Consequently, the fingerprint sweep sensor 124 detects the fingerprint on the moved finger.

As shown in FIG. 3, the downward slope 123a and upward slope 123b of the V-shaped groove 123 have different tilt angles $\alpha$ and $\beta$, which satisfy $\alpha > \beta$. The tilt angles $\alpha$ and $\beta$ are determined in such a way as to prevent the key 121b in FIG. 2 from being pressed by mistake during fingerprint detection and to detect the fingerprint reliably with the fingertip moved in contact with the fingerprint sweep sensor 124.

As shown in FIG. 4, the fingerprint sweep sensor 124 is located at the bottom of the V-shaped groove 123 under which lies over a ridge line 123c where an extension surface of the first slope 123a and an extension surface of the second slope 123b meet. Also, the top face 124a of the fingerprint sweep sensor protrudes by a height b.

By placing the fingerprint sweep sensor 124 at this position, it is possible to stabilize the finger pressure applied to the fingerprint sweep sensor 124 when the finger is moved along the first slope 123a and second slope 123b. This allows the fingerprint to be detected more reliably. However, the fingerprint sweep sensor 124 does not have to be placed at this position and may be placed at another place in the V-shaped groove 123 where the fingerprint can be detected reliably.

Figure 5:
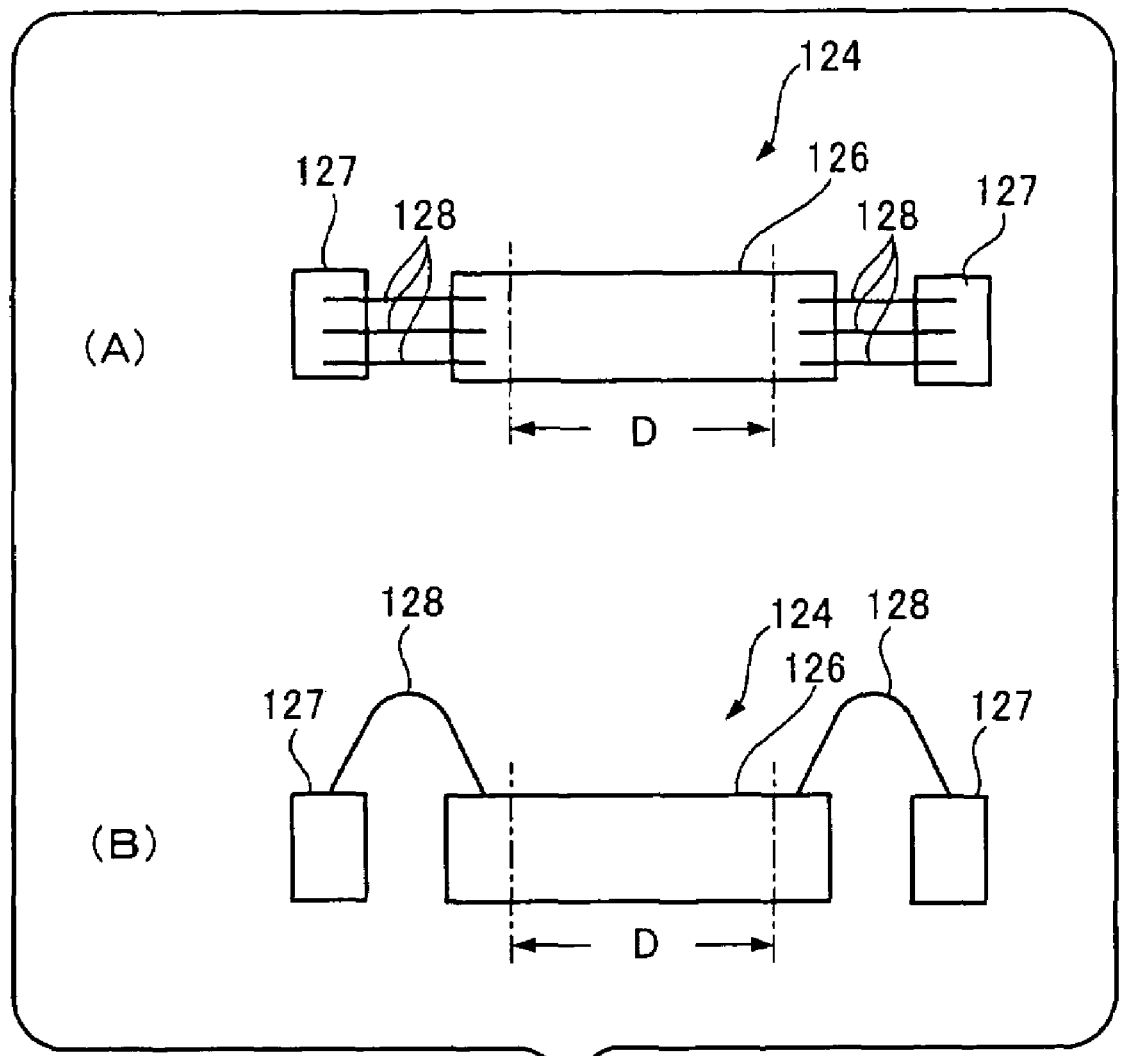
FIG. 5 is a diagram showing a structure of the fingerprint sweep sensor.

FIG. 5 is a diagram showing a structure of the fingerprint sweep sensor 124.

The fingerprint sweep sensor 124 consists of a one-dimensional line sensor 126, conductive pads 127 installed on both sides of the one-dimensional line sensor 126, bonding wires 128 which connect the one-dimensional line sensor 126 with the conductive pads 127, and a mold (not shown). The bonding wires 128 are installed bulging out on both sides of the one-dimensional line sensor 126. The mold is formed in such a way as to make the V-shaped groove 123 expose only an effective area D in the center by burying the bonding wires 128. In this way, the V-shaped groove 123 also works effectively to expose only the effective area D of the fingerprint sweep sensor 124 and hide the bulges on both sides in the bottom casing 120.

Incidentally, description has been given mainly of the placement location of the fingerprint sweep sensor and surrounding structure (including the V-shaped groove) in a mobile phone, which are typical of the above embodiment, and description of other functions of the mobile phone has been omitted. However, the mobile phone as referred to herein is irrespective of communication schemes and maybe, for example, a PHS (Personal Handyphone System).

Also, it goes without saying that the information processing unit as referred to herein may be a multifunction unit equipped with not only mobile phone functions, but also, for example, e-mail functions, camera functions, etc.

Furthermore, although a clamshell phone has been described herein, the present invention can be applied not only to clamshell phones, but also to various other types of phone. Furthermore, it can be applied to other information processing units such as PDAs (Personal Data Assistants).

Next, other embodiments of the present invention will be described. The only difference between the following embodiments to be described and the embodiment described with reference to FIGS. 1 to 5 is in the shape of the groove where the fingerprint sweep sensor is disposed. Accordingly, the other embodiments will be described by referring to only a figure that corresponds to and is used in place of FIG. 3 showing the shape of the groove of the above-described embodiment. The reference numerals shown in the following figures used in place of FIG. 3 are the same as those in FIG. 3 and only the different features will be described below.

Figure 6:
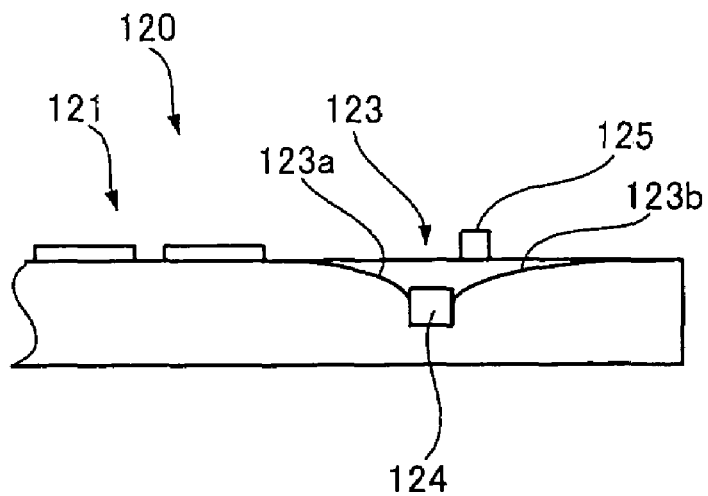
FIG. 6 is a sectional view of a groove of a mobile phone according to a second embodiment of the present invention.

FIG. 6 is a sectional view of a groove of a mobile phone according to a second embodiment of the present invention.

In the above-described embodiment, as shown in FIG. 3, the first slope that is the downward slope 123*a* and the second slope that is the upward slope 123*b* are both planes. However, in the second embodiment, each of the downward slope 123*a* and the upward slope 123*b* is upwardly convex as a whole and these slopes have mutually different tilt angles.

Figure 7:
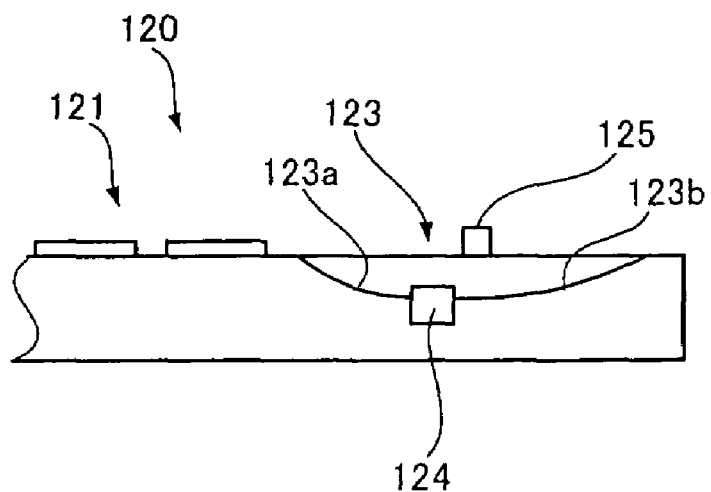
FIG. 7 is a sectional view of a groove of a mobile phone according to a third embodiment of the present invention.

FIG. 7 is a sectional view of a groove of a mobile phone according to a third embodiment of the present invention. In the third embodiment, each of the downward slope 123*a* and the upward slope 123*b* is downwardly convex (upwardly concave) as a whole and these slopes have mutually different tilt angles.

As shown in these other embodiments, the downward slope 123*a* and upward slope 123*b* is not limited to a plane. The slopes may be designed to any shape as long as they are upwardly or downwardly bulging so as to prevent incorrect key operations and to detect a fingerprint without fail.

What is claimed is:

1. A portable processing unit which comprises a casing equipped with an operation section, wherein:

the casing comprises, adjacent to the operation section, a groove which contains a first slope stretching away from the operation section and slanting downward and a second slope stretching further away from the operation section and slanting upward, wherein a finger moves downward along the first slope and the finger moves upward along the second slope;

the groove comprises a fingerprint sweep sensor which detects a fingerprint; and the first slope and the second slope have mutually different lengths, wherein an entire sensing surface of the fingerprint sweep sensor protrudes above an inner surface of the groove.

2. The portable telephone according to claim 1, wherein the fingerprint sweep sensor is located in the groove in such a way as to hide a ridge line where an extension surface of the first slope and an extension surface of the second slope meet.

3. The information processing unit according to claim 1, wherein the information processing unit is a portable telephone.

* * * * *